(12) United States Patent
Feng (10) Patent No.: US 11,527,178 B2
(45) Date of Patent: Dec. 13, 2022

(54) FOLDABLE DISPLAY DEVICE, MANUFACTURING METHOD THEREOF, AND JIG

(71) Applicant: Wuhan China Star Optoelectronics Semiconductor Display Technology Co., Ltd., Wuhan (CN)

(72) Inventor: Zikang Feng, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 118 days.

(21) Appl. No.: 16/769,278

(22) PCT Filed: Mar. 23, 2020

(86) PCT No.: PCT/CN2020/080695
§ 371 (c)(1),
(2) Date: Jun. 3, 2020

(87) PCT Pub. No.: WO2021/134930
PCT Pub. Date: Jul. 8, 2021

(65) Prior Publication Data
US 2021/0407339 A1    Dec. 30, 2021

(30) Foreign Application Priority Data
Jan. 3, 2020 (CN) .......................... 202010005918.0

(51) Int. Cl.
*G09F 9/30* (2006.01)
*G06F 1/16* (2006.01)
(Continued)

(52) U.S. Cl.
CPC ............ *G09F 9/301* (2013.01); *B32B 37/182* (2013.01); *B32B 38/0012* (2013.01);
(Continued)

(58) Field of Classification Search
CPC ....... G09F 9/301; G09F 1/1652; G09F 1/1616
(Continued)

(56) References Cited

U.S. PATENT DOCUMENTS

| | | | |
|---|---|---|---|
| 2014/0002973 A1 | 1/2014 | Lee et al. | |
| 2014/0002975 A1 | 1/2014 | Lee et al. | |
| 2015/0321442 A1 | 11/2015 | Lee et al. | |
| 2016/0021764 A1 | 1/2016 | Lee et al. | |

(Continued)

FOREIGN PATENT DOCUMENTS

| | | |
|---|---|---|
| CN | 203983240 | 12/2014 |
| CN | 104679341 | 6/2015 |

(Continued)

*Primary Examiner* — Tahseen Khan
(74) *Attorney, Agent, or Firm* — PV IP PC; Wei Te Chung; Ude Lu (57) ABSTRACT

The present application provides a foldable display device, a manufacturing method thereof, and a jig. The foldable display device includes a folding region, a non-folding region, a flexible display panel, and a functional layer attached through an adhesive layer. In a pre-bent state of the foldable display device, an angle between portions of the foldable display device corresponding to the non-folding region on two opposite sides of the folding region is greater than 0 degree and less than 180 degrees. A stress of a portion of the adhesive layer corresponding to the folding region is less than or equal to a first predetermined threshold.

11 Claims, 8 Drawing Sheets

(51) Int. Cl.
 *B32B 37/18* (2006.01)
 *B32B 38/00* (2006.01)
 *B32B 38/18* (2006.01)
 *B32B 7/00* (2019.01)
(52) U.S. Cl.
 CPC ...... *B32B 38/1858* (2013.01); *B32B 38/1866* (2013.01); *G06F 1/1616* (2013.01); *G06F 1/1652* (2013.01); *B32B 7/00* (2013.01); *B32B 2307/546* (2013.01); *B32B 2309/06* (2013.01); *B32B 2309/16* (2013.01); *B32B 2457/20* (2013.01)
(58) Field of Classification Search
 USPC .................................................... 365/679.01
 See application file for complete search history.

(56) References Cited

U.S. PATENT DOCUMENTS

| | | | |
|---|---|---|---|
| 2017/0042046 A1 | 2/2017 | Lee et al. | |
| 2017/0199547 A1* | 7/2017 | Jeong | G06F 1/1652 |
| 2019/0047900 A1 | 2/2019 | Hu et al. | |
| 2020/0229313 A1 | 7/2020 | Lee et al. | |
| 2021/0367206 A1* | 11/2021 | Li | H01L 51/5253 |

FOREIGN PATENT DOCUMENTS

| | | |
|---|---|---|
| CN | 207302506 | 5/2018 |
| CN | 108773142 | 11/2018 |
| CN | 108779018 | 11/2018 |
| CN | 110605899 | 12/2019 |
| CN | 110148358 | 8/2020 |

* cited by examiner

FIG. 13 ated and a difference in radiuses of the film layers in a bending region.

FOLDABLE DISPLAY DEVICE, MANUFACTURING METHOD THEREOF, AND JIG

RELATED APPLICATIONS

This application is a National Phase of PCT Patent Application No. PCT/CN2020/080695 having International filing date of Mar. 23, 2020, which claims the benefit of priority of Chinese Patent Application No. 202010005918.0, filed on Jan. 3, 2020. The contents of the above applications are all incorporated by reference as if fully set forth herein in their entirety.

FIELD AND BACKGROUND OF THE INVENTION

The present application is related to the field of display technology, and specifically, to a foldable display device, a manufacturing method thereof, and a jig.

Flexible organic light-emitting diode (OLED) display panels have received widespread attention for their flexibility, and one of their main uses is in foldable display devices.

Currently, when a flexible organic light-emitting diode display panel is applied to a foldable display device, because the flexible organic light-emitting diode display panel is repeatedly bent or kept bent for a long time during use of the foldable display device, a portion of the flexible organic light-emitting diode display panel corresponding to a bending region of the foldable display device has a large deformation. Because of a long-term deformation state and a difference in radiuses of film layers in the bending region, the film layers are in a long-term misaligned state, and the flexible organic light-emitting diode display panel is at a risk of causing breaking.

Therefore, the prior art has defects and needs to be urgently solved.

SUMMARY OF THE INVENTION

The present application provides a foldable display device, a manufacturing method thereof, and a jig, which can solve a problem of a foldable display device in the prior art that a flexible organic light-emitting diode display panel is at a risk of causing breaking, and film layers are in a long-term misaligned state because of a long-term deformation state and a difference in radiuses of the film layers in a bending region.

In order to solve the above problem, the present application provides technical solutions as follows.

The present application provides the foldable display device, including a folding region; a non-folding region disposed on two opposite sides of the folding region; a flexible display panel; and at least one functional layer attached to the flexible display panel through an adhesive layer. The foldable display device includes a pre-bent state. In the pre-bent state, an angle between portions of the foldable display device corresponding to the non-folding region on two opposite sides of the folding region is greater than 0 degree and less than 180 degrees. A stress of a portion of the adhesive layer corresponding to the folding region is less than or equal to a first predetermined threshold.

In the foldable display device of the present application, the first predetermined threshold ranges from 0.008 to 0.012 MPa.

In the foldable display device of the present application, when the foldable display device is in the pre-bent state, a stress variation amount of the adhesive layer is equal to 0 MPa.

In the foldable display device of the present application, when the foldable display device is in the pre-bent state, the angle between the portions of the foldable display device corresponding to the non-folding region on two opposite sides of the folding region is greater than or equal to 10 degrees and less than or equal to 170 degrees.

In the foldable display device of the present application, when the foldable display device is in a flattened state, a stress of a portion of the flexible display panel corresponding to the folding region is less than or equal to a second predetermined threshold, and a stress of a portion of the functional layer corresponding to the folding region is less than or equal to a third predetermined threshold.

In the foldable display device of the present application, the second predetermined threshold ranges from 8 to 12 MPa, and the third predetermined threshold ranges from 0.8 to 11 MPa.

In the foldable display device of the present application, when the foldable display device is in the flattened state, stress variation amounts of the flexible display panel and the adhesive layer are equal to 0 MPa.

In the foldable display device of the present application, when the foldable display device is in the pre-bent state, a stress of a portion of the flexible display panel corresponding to the folding region is less than or equal to a second predetermined threshold, and a stress of a portion of the functional layer corresponding to the folding region is less than or equal to a third predetermined threshold.

In the foldable display device of the present application, the second predetermined threshold ranges from 8 to 12 MPa, and the third predetermined threshold ranges from 0.8 to 11 MPa.

In the foldable display device of the present application, when the foldable display device is in the pre-bent state, stress variation amounts of the flexible display panel and the adhesive layer are equal to 0 MPa.

In the foldable display device of the present application, when the foldable display device is in the pre-bent state, a portion of the foldable display device corresponding to the folding region is curved in an arc shape, an elliptical arc shape, or an approximately droplet shape. The approximately droplet shape includes two curved segments disposed in a mirror image. Each curved segment includes a first end and a second end. A curvature of the curved segment is increased from the first end to the second end. The second ends of the two curved segments coincide.

In order to solve the above technical problem, the present application further provides the manufacturing method of the foldable display device. The foldable display device includes a flexible display panel and at least one functional layer. The manufacturing method includes the steps of:

providing a jig, wherein the jig includes a first jig and a second jig, the first jig includes a first inclined plane, a second inclined plane, and a curved surface connected to the first inclined plane and the second inclined plane, and an angle between the first inclined plane and the second inclined plane is greater than 0 degree and less than 180 degrees;

placing one of the flexible display panel or the functional layer on the first inclined plane, the second inclined plane, and the curved surface of the first jig;

forming an adhesive layer on a surface of the flexible display panel or the functional layer placed on the first jig away from the first jig; and pressing the second jig onto the first jig to bond another one of the flexible display panel or the functional layer to the adhesive layer and obtain the foldable display device including a pre-bent state, wherein in the pre-bent state, a stress of a bent portion of the adhesive layer is less than or equal to a first predetermined threshold.

In the manufacturing method of the present application, the first predetermined threshold ranges from 0.008 to 0.012 MPa.

In the manufacturing method of the present application, a vacuum suction hole is disposed on a surface of the first jig, and the vacuum suction hole is in communication with an adsorption device. The manufacturing method includes the steps of:

pressing one of the flexible display panel in a flattened state or the functional layer in the flattened state onto the first inclined plane, the second inclined plane, and the curved surface of the first jig by the second jig to form the pre-bent state and maintaining the pre-bent state by adsorption of the vacuum suction hole;

forming the adhesive layer on the surface of the flexible display panel or the functional layer placed on the first jig away from the first jig; and pressing the second jig onto the first jig to bond another one of the flexible display panel in the flattened state or the functional layer in the flattened state to the adhesive layer and obtain the foldable display device including the pre-bent state.

In the manufacturing method of the present application, a vacuum suction hole is disposed on a surface of the first jig, and the vacuum suction hole is in communication with an adsorption device. The manufacturing method includes the steps of:

pressing one of the flexible display panel in the pre-bent state or the functional layer in the pre-bent state onto the first inclined plane, the second inclined plane, and the curved surface of the first jig and fixing one of the flexible display panel in the pre-bent state or the functional layer in the pre-bent state by adsorption of the vacuum suction hole;

forming the adhesive layer on the surface of the flexible display panel or the functional layer placed on the first jig away from the first jig; and pressing the second jig onto the first jig to bond another one of the flexible display panel in the pre-bent state or the functional layer in the pre-bent state to the adhesive layer and obtain the foldable display device including the pre-bent state.

In order to solve the above technical problem, the present application further provides the jig for manufacturing the foldable display device. The jig includes a first jig and a second jig used in cooperation with the first jig.

The first jig includes a first inclined plane, a second inclined plane, and a curved surface connected to the first inclined plane and the second inclined plane. An angle between the first inclined plane and the second inclined plane is greater than 0 degree and less than 180 degrees.

The foldable display device includes a flexible display panel and at least one functional layer. The second jig is used to press the flexible display panel and the functional layer between the first jig and the second jig. The flexible display panel and the functional layer are bonded by pressing of the second jig to form the foldable display device including a pre-bent state.

In the jig of the present application, an angle between the first inclined plane and the second inclined plane is greater than or equal to 10 degrees and less than or equal to 170 degrees.

In the jig of the present application, the angle between the first inclined plane and the second inclined plane is equal to 90 degrees. A vacuum suction hole is disposed on a surface of the first jig. The vacuum suction hole is in communication with an adsorption device.

In the jig of the present application, the foldable display device includes a folding region. An arc length of a cross-section of a curved surface of the first jig is equal to a width of the folding region of the foldable display device. The curved surface of the first jig is curved in an arc shape, an elliptical arc shape, or an approximately droplet shape. The approximately droplet shape includes two curved segments disposed in a mirror image. Each curved segment includes a first end and a second end. A curvature of the curved segment is increased from the first end to the second end. The second ends of the two curved segments coincide.

In the jig of the present application, the first jig is a hard jig, the second jig is a soft jig, and a depression matching the first jig is formed by pressing and respectively attaching the second jig from a top portion of the curved surface of the first jig to two opposite sides, which are the first inclined plane and the second inclined plane; or the first jig and the second jig are hard jigs, the second jig is a roller, and an axial direction of the roller is parallel to the first jig.

In traditional technology, during a process of repeated folding, which folds the foldable display device in the flattened state without stress (tensile stress and compressive stress) to a fully folded state, because of glue layers (adhesive layer) between the film layers being in the long-term deformation state and the difference in radiuses of the film layers in the bending region, the flexible organic light-emitting diode display panel is at the risk of causing breaking. Compared with that, in a process of manufacturing the foldable display device, the present application attaches different film layers of the foldable display device in the pre-bent state through the adhesive layer. Because a deformation amount of the adhesive layer in the pre-bent state is 0, maximum deformation amounts of the adhesive layer between film layers in the flattened state and the fully folded state are reduced, thereby reducing a risk of causing breaking the adhesive layer and a risk of causing peeling or breaking between the film layers.

BRIEF DESCRIPTION OF THE SEVERAL VIEWS OF THE DRAWINGS

The following describes specific embodiments of the present application in detail with reference to the accompanying drawings, which will make technical solutions and other beneficial effects of the present application obvious.

DESCRIPTION OF SPECIFIC EMBODIMENTS OF THE INVENTION

To further explain the technical means and effect of the present application, the following refers to embodiments and drawings for detailed description. Obviously, the described embodiments are only for some embodiments of the present application, instead of all embodiments. All other embodiments based on embodiments in the present application and obtained by those skilled in the art without creative efforts are within the scope of the present application.

Examples are described below with reference to the appended drawings, and the drawings illustrate particular embodiments in which the present application may be practiced. Directional terms mentioned in the present application, such as lateral, longitudinal, length, width, upper, lower, front, rear, left, right, vertical, horizontal, etc., only refer to directions in the accompanying drawings. Thus, the adoption of directional terms is used to describe and understand the present application, but not to limit the present application. In addition, the terms first and second are merely used for illustrative purposes only, but are not to be construed as indicating or imposing a relative importance or implicitly indicating the number of technical features indicated. Thus, a feature that defines "first" or "second" may expressly or implicitly include one or more of the features. In the description of the present application, the meaning of "a plurality" is two or more, unless specifically defined otherwise. In this application, "l" means "or".

In addition, reference numerals and/or reference letters are repeated in different examples of the present disclosure. The repetition is for the purpose of simplicity and clarity and do not indicate the relationship between various embodiments and/or arrangements discussed herein.

Figure 1A:
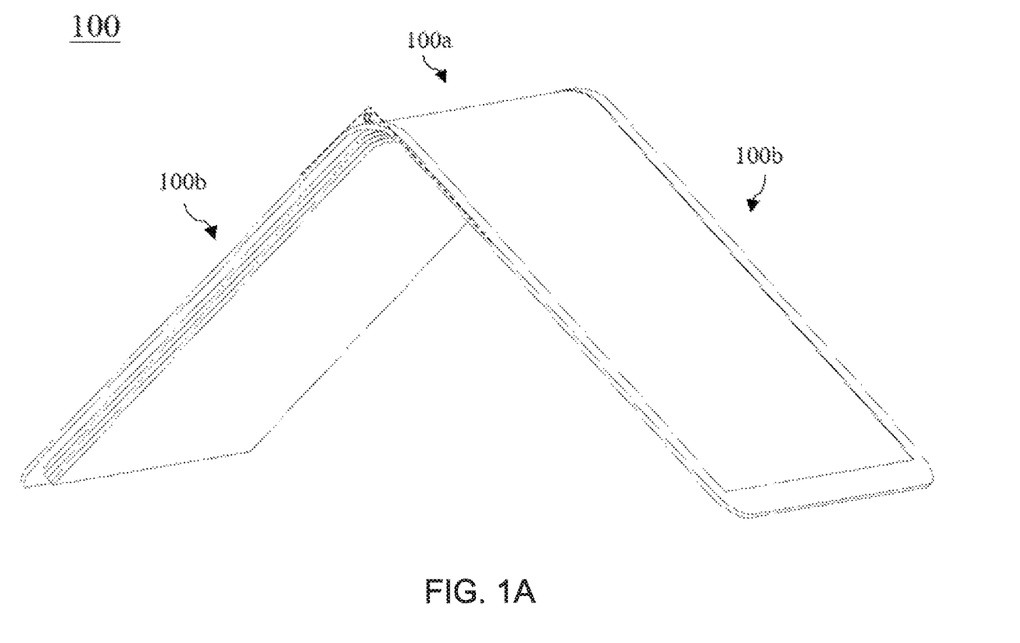
FIG. 1A is a three-dimensional structural diagram of a foldable display device in a pre-bent state provided by an embodiment of the present application.

Please refer to FIG. 1A, which is a three-dimensional structural diagram of a foldable display device in a pre-bent state provided by an embodiment of the present application. The foldable display device 100 can be an in-folding display device or an out-folding display device. The foldable display device 100 includes a folding region 100a and a non-folding region 100b disposed on two opposite sides of the folding region 100a. Portions of the foldable display device 100 corresponding to the folding region 100a and the non-folding region 100b are both used to display images.

The foldable display device 100 includes the pre-bent state. As shown in FIG. 1A, when the foldable display device 100 is in the pre-bent state, an angle α between portions of the foldable display device 100 corresponding to the non-folding region 100b on two opposite sides of the folding region 100a is greater than 0 degree and less than 180 degrees. When the foldable display device 100 is in the pre-bent state, a portion of the foldable display device 100 corresponding to the non-folding region 100b is flat, and a portion of the foldable display device 100 corresponding to the folding region 100a is curved in an arc shape.

Furthermore, when the foldable display device 100 is in the pre-bent state, the angle α between the portions of the foldable display device 100 corresponding to the non-folding region 100b on two opposite sides of the folding region 100a is greater than or equal to 10 degrees and less than or equal to 170 degrees.

Furthermore, when the foldable display device 100 is in the pre-bent state, the angle α between the portions of the foldable display device 100 corresponding to the non-folding region 100b on two opposite sides of the folding region 100a is equal to 90 degrees.

The foldable display device 100 can be switched between a flattened state, a fully folded state, and an intermediate state between the flattened state and the fully folded state.

Figure 1B:
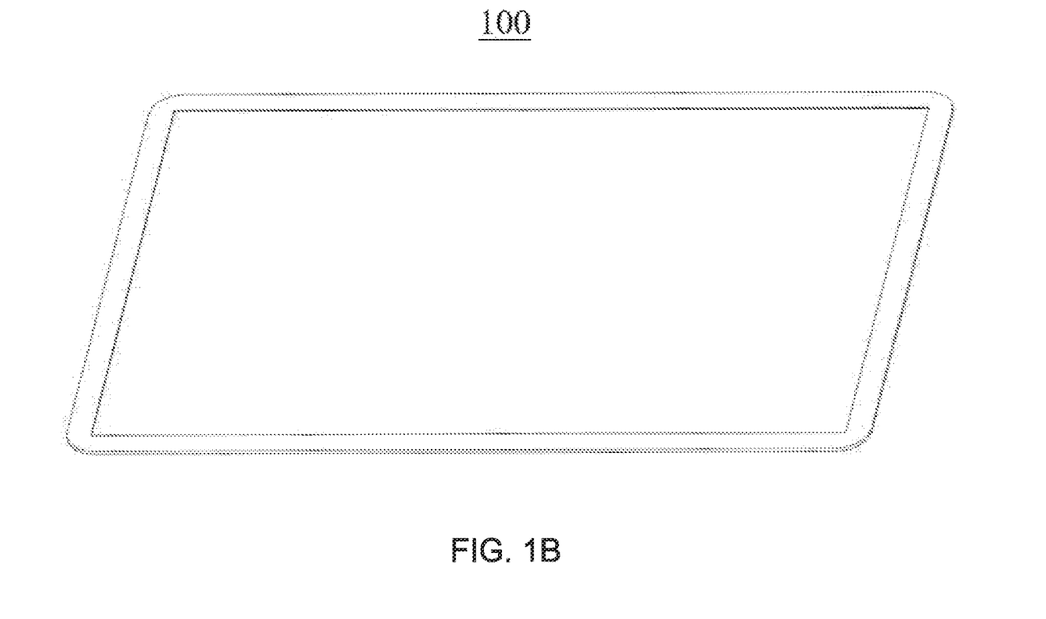
FIG. 1B is a three-dimensional structural diagram of the foldable display device shown in FIG. 1A in a flattened state.

Please refer to FIG. 1B, which is a three-dimensional structural diagram of the foldable display device shown in FIG. 1A in the flattened state. When the foldable display device 100 is switched from the pre-bent state to the flattened state, the angle between the portions of the foldable display device 100 corresponding to the non-folding region 100b on two opposite sides of the folding region 100a is gradually increased from α to 180 degrees.

Figure 1C:
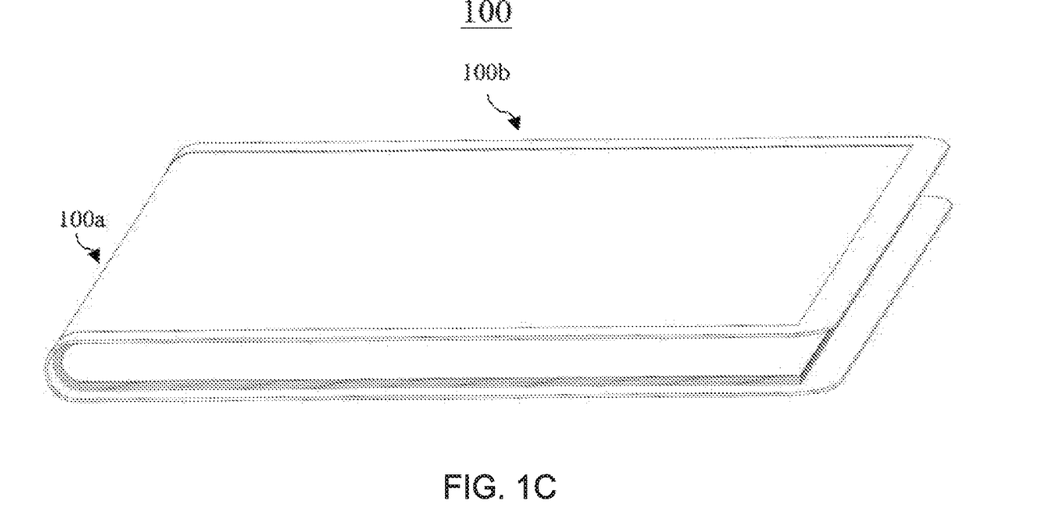
FIG. 1C is a three-dimensional structural diagram of the foldable display device shown in FIG. 1A in a fully folded state.

Please refer to FIG. 1C, which is a three-dimensional structural diagram of the foldable display device shown in FIG. 1A in the fully folded state. The foldable display device 100 shown in FIG. 1C is the out-folding display device. The foldable display device 100 is U-shaped as a whole after being fully folded, but is not limited thereto. When the foldable display device 100 is switched from the pre-bent state to the fully folded state, the angle between the portions of the foldable display device 100 corresponding to the non-folding region 100b on two opposite sides of the folding region 100a is gradually decreased from α to 0 degree.

In this embodiment, a width of the folding region 100a of the foldable display device 100 ranges from 3 to 300 millimeters. For example, the width of the foldable display device 100 can be 20, 50, 100, 200, and 250 millimeters.

Figure 2:
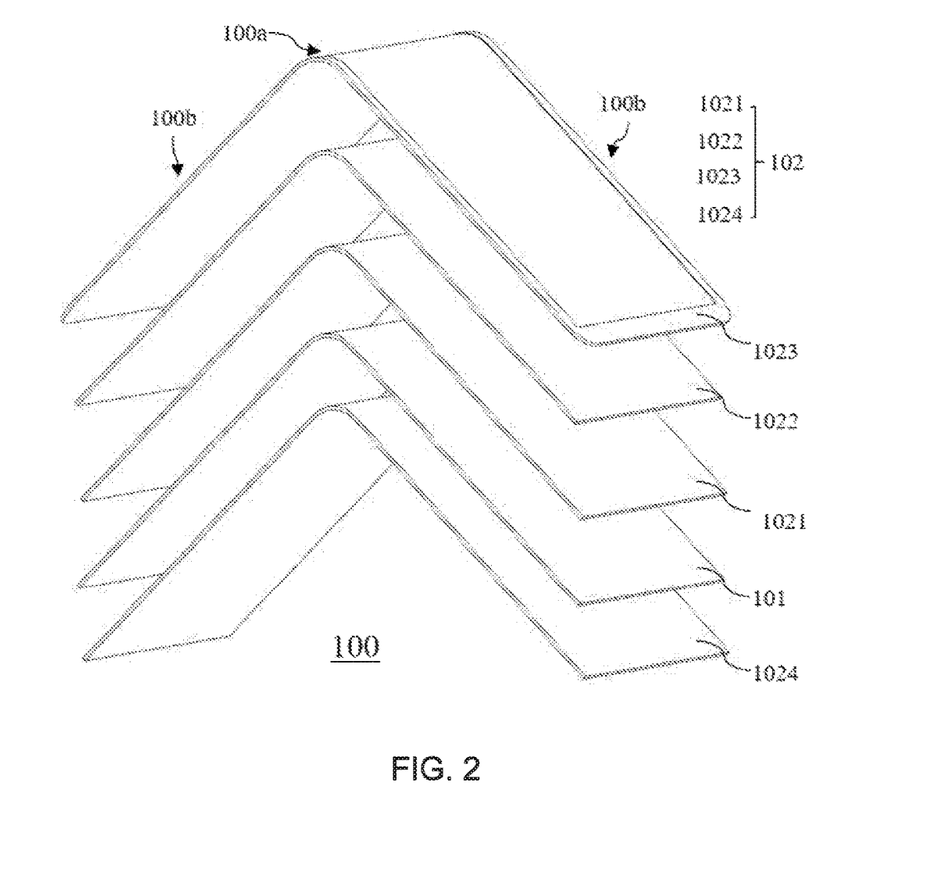
FIG. 2 is an exploded structural diagram of the foldable display device shown in FIG. 1A in the pre-bent state.

Please refer to FIG. 2, which is an exploded structural diagram of the foldable display device shown in FIG. 1A in the pre-bent state. The foldable display device 100 includes a flexible display panel 101 and at least one functional layer 102. The flexible display panel 101 can be a flexible organic light-emitting diode display panel. The flexible display panel 101 includes a flexible substrate, a thin-film transistor layer, a light-emitting device layer, and a thin-film encapsulation layer, which are sequentially stacked.

In the present application, the functional layer 102 includes at least one of a touch layer 1021, a polarizer 1022, a protective cover-plate 1023, a back cover-plate 1024, or a rigid support layer (not shown), but is not limited thereto. In this embodiment, the back cover-plate 1024, the flexible display panel 101, the touch layer 1021, the polarizer 1022, and the protective cover-plate 1023 are sequentially stacked.

Figure 3:
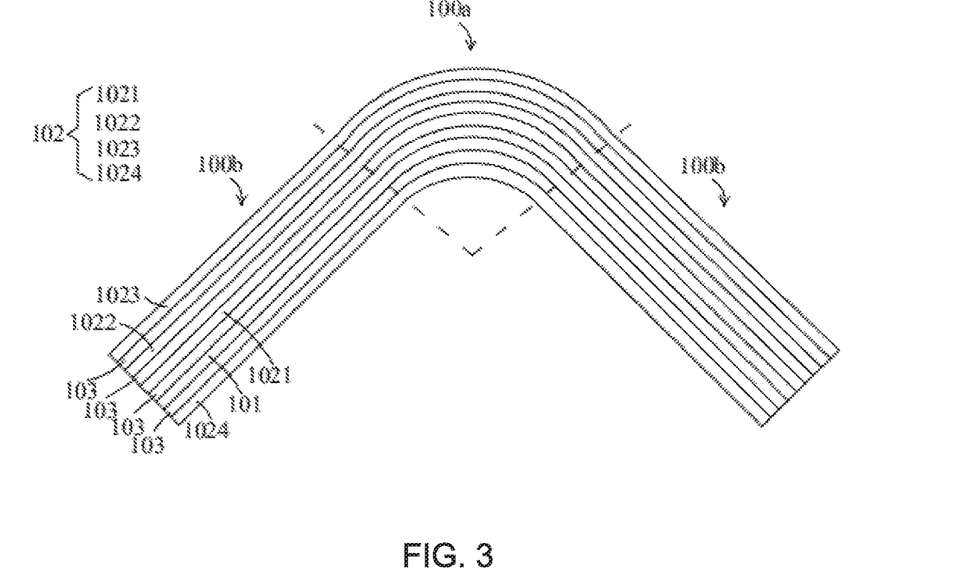
FIG. 3 is a cross-sectional structural diagram of the foldable display device shown in FIG. 1A in the pre-bent state.

Please refer to FIG. 3, which is a cross-sectional structural diagram of the foldable display device shown in FIG. 1A in the pre-bent state. The foldable display device 100 further includes an adhesive layer 103. The adhesive layer 103 is disposed between the flexible display panel 101 and the functional layer 102, for example, the adhesive layer 103 is disposed between the flexible display panel 101 and the touch layer 1021 and the back cover-plate 1024; or, the adhesive layer 103 is disposed between two adjacent functional layers 102, for example, the adhesive layer 103 is disposed between the polarizer 1022 and the protective cover-plate 1023. The adhesive layer is an optical transparent adhesive. A thickness of the adhesive layer 103 ranges from 15 to 100 micrometers.

When the foldable display device 100 is in the pre-bent state, a stress of a portion of the adhesive layer 103 corresponding to the folding region is less than or equal to a first predetermined threshold.

Furthermore, the first predetermined threshold ranges from 0.008 to 0.012 MPa.

Furthermore, a deformation amount of the adhesive layer in the pre-bent state is 0, that is, when the foldable display device 100 is in the pre-bent state, a stress variation amount of the adhesive layer 103 is equal to 0 MPa. It should be explained that in the present application, "the deformation amount is 0" means that the deformation amount in a macro sense is 0. The deformation amount in the macro sense being 0 means that the deformation amount recognized by human eyes is 0.

A portion of the foldable display device 100 corresponding to the folding region 100*a* is curved in an arc shape. The portions of the flexible display panel 101 and the functional layer 102 corresponding to the folded region 100*a* have a same curvature when they are in the pre-bent state.

The flexible display panel 101 and the functional layer 102 provided by the present application include two types. A first type of the flexible display panel 101 and a first type of the functional layer 102 are in the flattened state before being bonded, which means that a single flexible display panel 101 and a single functional layer 102 are in the flattened state in an initial state. In other words, when the foldable display device 100 is in the flattened state, the stress of the portion of the first type of the flexible display panel 101 corresponding to the folding region is less than or equal to a second predetermined threshold, and the stress of the portion of the first type of the functional layer 102 corresponding to the folding region is less than or equal to a third predetermined threshold.

Furthermore, the second predetermined threshold ranges from 8 to 12 MPa, and the third predetermined threshold ranges from 0.8 to 11 MPa.

Furthermore, when the foldable display device 100 is in the flattened state, stress variation amounts of the flexible display panel 101 and the functional layer 102 are equal to 0 MPa, which are in the initial state.

States of a second type of the flexible display panel 101 and a second type of the functional layer 102 are same as the pre-bent state of the flexible display panel 101 before being bonded, which means that a single flexible display panel 101 and a single functional layer 102 are in the pre-bent state in the initial state, as shown in FIG. 2. In other words, when the foldable display device 100 is in the pre-bent state, the stress of the portion of the second type of the flexible display panel 101 corresponding to the folding region is less than or equal to the second predetermined threshold, and the stress of the portion of the second type of the functional layer 102 corresponding to the folding region is less than or equal to the third predetermined threshold.

Furthermore, the second predetermined threshold ranges from 8 to 12 MPa, and the third predetermined threshold ranges from 0.8 to 11 MPa.

Furthermore, when the foldable display device 100 is in the pre-bent state, the stress variation amounts of the flexible display panel 101 and the functional layer 102 are equal to 0 MPa, which are in the initial state.

Figure 4:
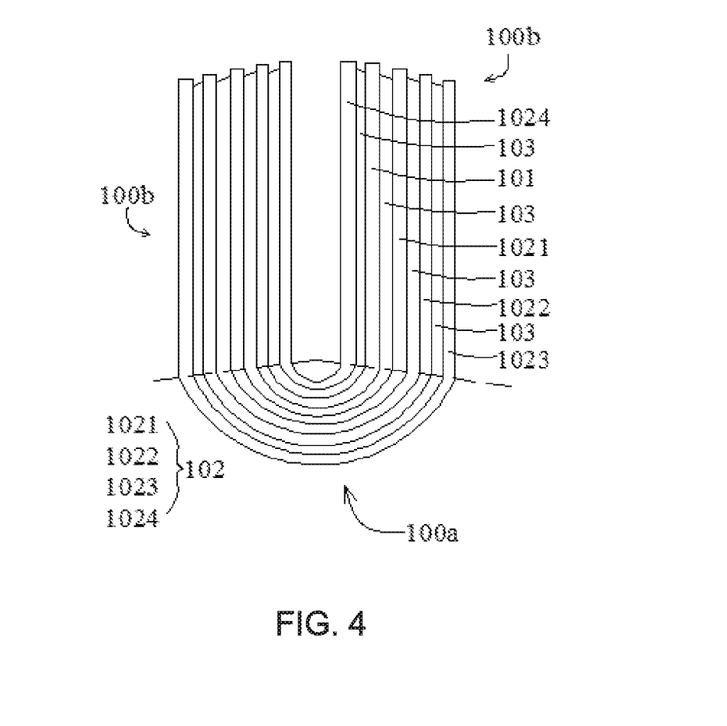
FIG. 4 is a cross-sectional structural diagram of the foldable display device shown in FIG. 1B in the flattened state.
Figure 5:
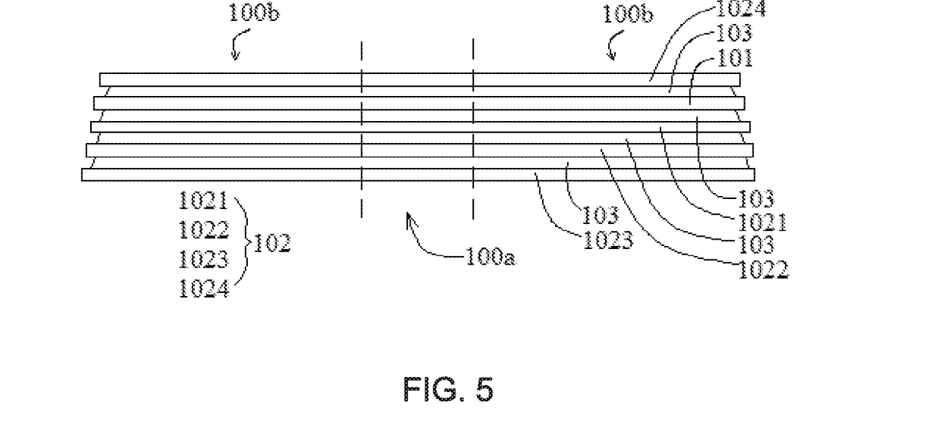
FIG. 5 is a cross-sectional structural diagram of the foldable display device shown in FIG. 1C in the fully folded state.

With reference to FIGS. 3 to 5, the foldable display device 100 has following characteristics after respectively adopting the above two types of the flexible display panel 101 and the functional layer 102.

When the foldable display device 100 is in the pre-bent state, there is no misalignment between the flexible display panel 101 and the functional layer 102 and between two adjacent functional layers 102, which means that a misalignment amount is 0. As shown in FIG. 3, the back cover-plate 1024, the flexible display panel 101, the touch layer 1021, the polarizer 1022, and the protective cover-plate 1023 are all flush. At this time, the deformation amount of the adhesive layer 103 is 0.

When the foldable display device 100 is switched from the pre-bent state to the flattened state, as shown in FIG. 4, misalignments occur between the flexible display panel 101 and the functional layer 102 and between two adjacent functional layer 102, which are negative misalignments. The generated misalignment amounts are a same and both are first misalignment amounts. For example, the first misalignment amount is −0.5 millimeters (the data here is for convenience only and does not limit the specific misalignment amount). At this time, the adhesive layer 103 between two adjacent film layers is deformed, which is a negative deformation amount. The generated deformation amounts are a same and both are first deformation amounts. For example, the first deformation amount is −0.5 millimeters (the data here is for convenience only and does not limit the specific deformation amount).

When the foldable display device 100 is switched from the pre-bent state to the fully folded state, as shown in FIG. 5, the misalignments occur between the flexible display panel 101 and the functional layer 102 and between two adjacent functional layer 102, which are positive misalignments. The generated misalignment amounts are a same and both are second misalignment amounts. For example, the second misalignment amount is 0.5 millimeters (the data here is for convenience only and does not limit the specific misalignment amount). At this time, the adhesive layer 103 between two adjacent film layers is deformed, which is a positive deformation amount. The generated deformation amounts are a same and both are second deformation amounts. For example, the second deformation amount is 0.5 millimeters (the data here is for convenience only and does not limit the specific deformation amount).

An absolute value of the first deformation amount of the adhesive layer 103 is equal to an absolute value of the second deformation amount of the adhesive layer 103. An absolute value of the first misalignment amount of the foldable display device 100 is equal to an absolute value of the second misalignment amount of the foldable display device 100.

Figure 6:
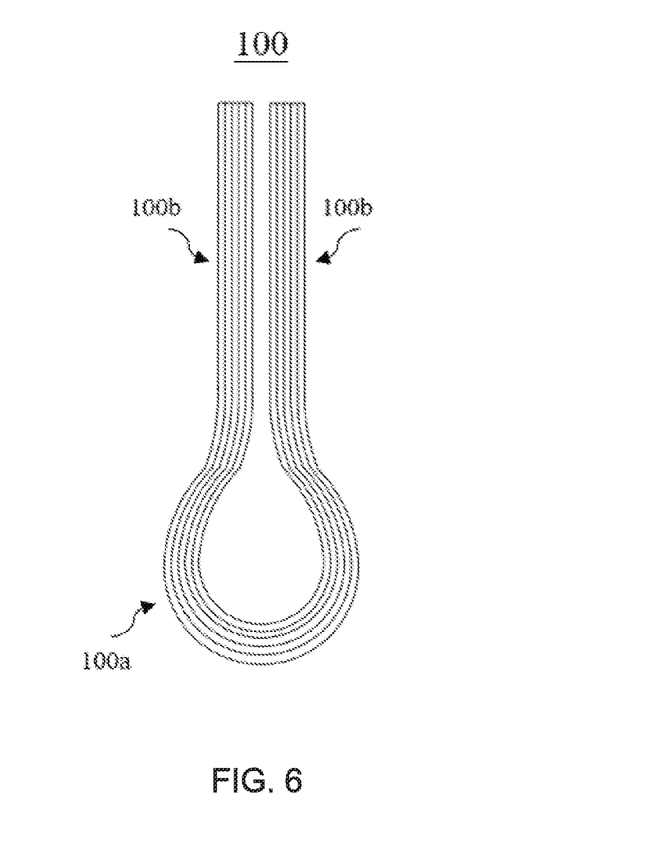
FIG. 6 is another structural diagram of the foldable display device shown in FIG. 1A in the fully folded state.

Please refer to FIG. 6, which is another structural diagram of the foldable display device shown in FIG. 1A in the fully folded state. The foldable display device shown in FIG. 6 is the in-folding display device. A portion of the foldable display device shown in FIG. 6 corresponding to the folding region 100a is a droplet shape after being fully folded, and display surfaces on two opposite sides of the folding region 100a of the foldable display device 100 are opposite to each other.

Figure 12:
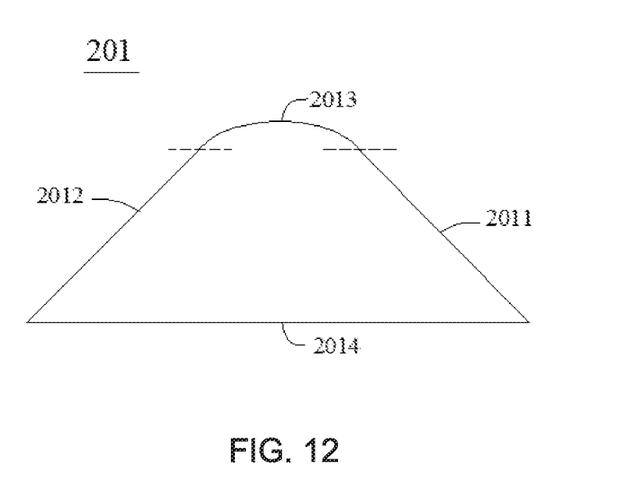
FIG. 12 is a cross-sectional structural diagram of a second type of a first jig provided by the present application.
Figure 13:
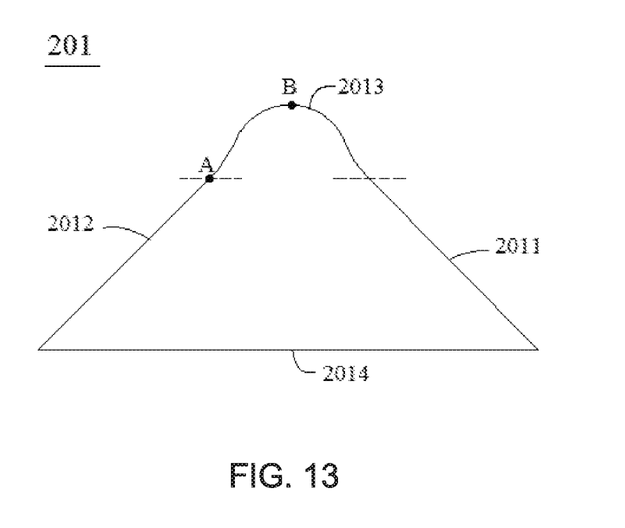
FIG. 13 is a cross-sectional structural diagram of a third type of the first jig provided by the present application.

In addition, when the foldable display device 100 is in the pre-bent state, the portion of the foldable display device 100 corresponding to the folding region 100a can be curved in an approximately droplet shape. The approximately droplet shape includes two curved segments disposed in a mirror image. Each curved segment includes a first end and a second end. A curvature of the curved segment is increased from the first end to the second end. The second ends of the two curved segments coincide. This type of the foldable display device in the pre-bent state is made by using a jig as shown in FIG. 13. When the foldable display device 100 is switched from the pre-bent state that the folding region 100a is curved in the approximately droplet shape to a folded state in the droplet shape, the deformation amounts generated by the foldable display device 100 and the adhesive layer between the film layers are smaller. When the foldable display device is in the pre-bent state, the portion of the foldable display device 100 corresponding to the folding region 100a can also be curved in an elliptical arc shape. This type of the foldable display device in the pre-bent state is made by using a jig as shown in FIG. 12.

Misalignment amounts of a flexible display panel and functional layers of a traditional foldable display device in the flattened state (i.e., the initial state) are 0, and deformation amounts thereof are 0. After switching to the fully folded state (i.e., the misalignment amount is maximum, and the deformation amount is maximum), the misalignment amounts of the flexible display panel and functional layers are 1, and the deformation amounts thereof are 1. Because the foldable display panel is repeatedly bent or kept bent for a long time, a difference in radiuses of film layers causes the film layers being in a long-term misaligned state. Because of glue (i.e., adhesive layer) between the film layers being in the long-term deformation state, it is easy to cause problems such as peeling/separation/fracture between the film layers due to the misalignment of the film layers in the folded state of the foldable display device.

When the foldable display device of the present application is in the pre-bent state, no misalignment occurs between module materials (i.e., between the flexible display panel 101 and the functional layer 102 and between two adjacent functional layers 102). In the flattened state and the fully folded state, the misalignment occurs, but the misalignment amount is equivalent to half of that when the foldable display device using a traditional process of flat bonding is bent and folded. The deformation amount of the adhesive layer 103 of the foldable display device of the present application in the pre-bent state is 0, and an absolute value of the deformation amount of the adhesive layer in the flattened state and the fully folded state is equal to half of the deformation amount of an adhesive in the traditional foldable display device. Therefore, the present application reduces the maximum deformation amount of the adhesive layer during bending and reduces the maximum misalignment amount between the film layers, so as to solve the problems that the foldable display device is prone to peeling/separating/breaking between the film layers in the folded state.

Figure 7:
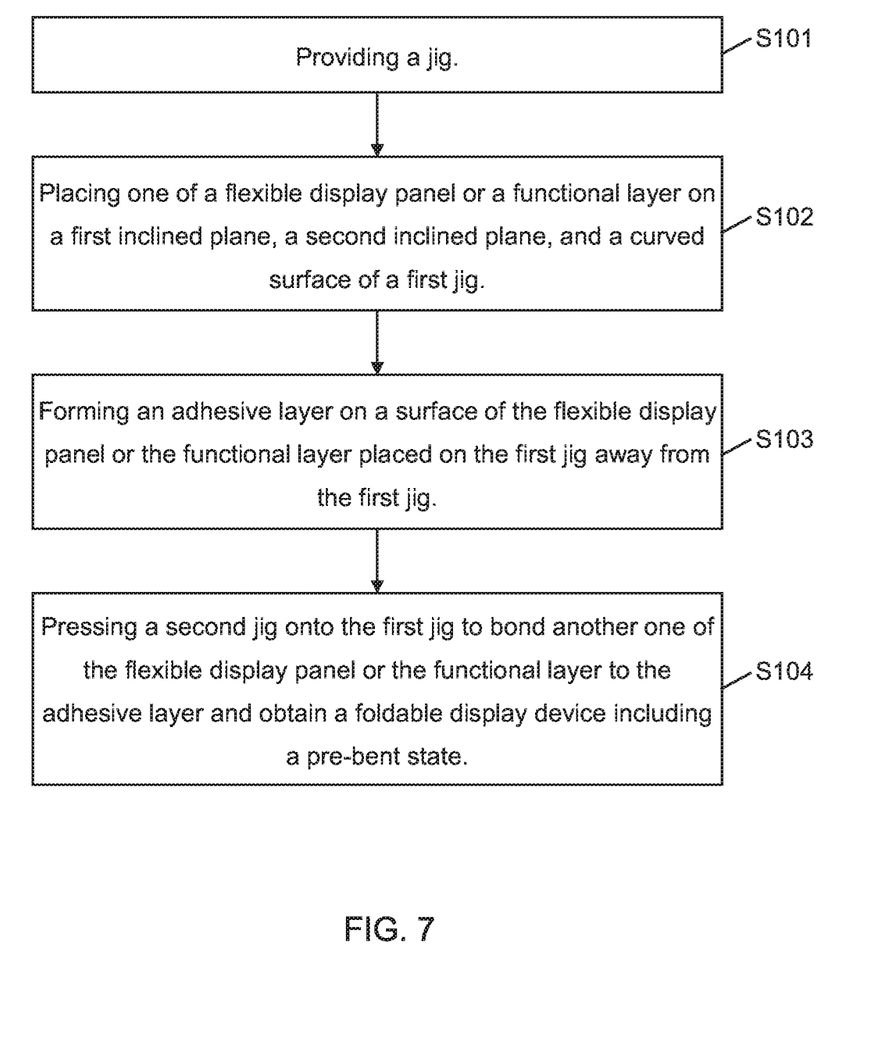
FIG. 7 is a flowchart of a manufacturing method of the foldable display device provided by the present application.

Please refer to FIG. 7, is a flowchart of a manufacturing method of the foldable display device provided by the present application. The manufacturing method of the foldable display device includes the steps of:

S101: providing a jig 20.

Figure 8:
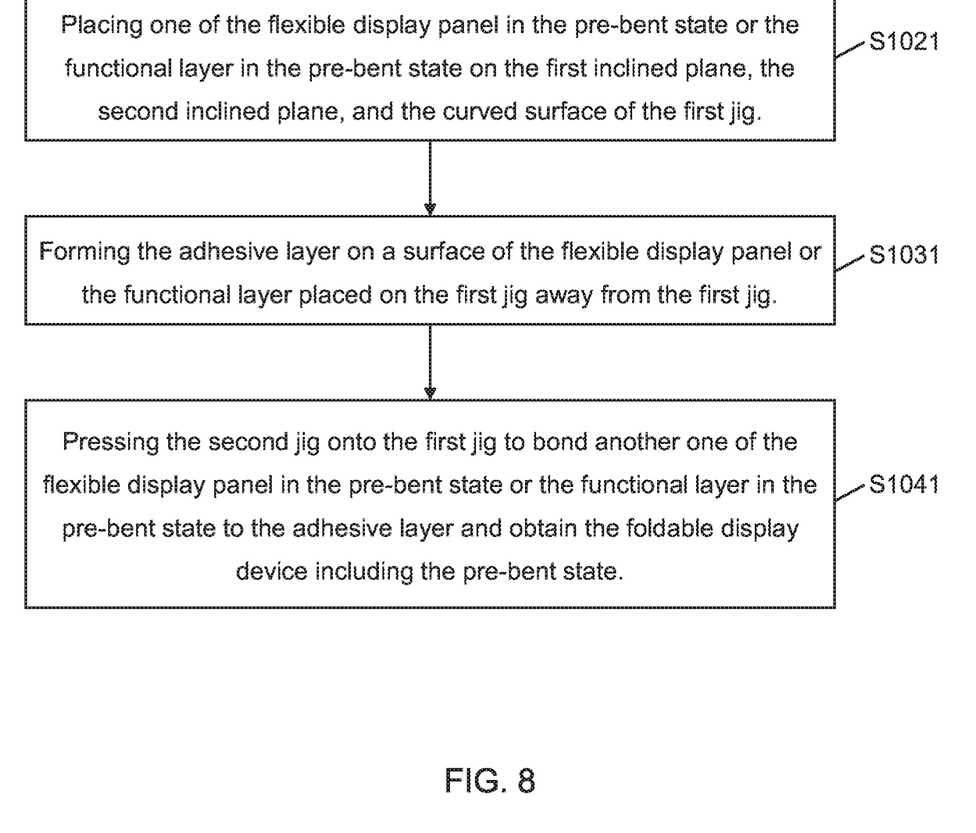
FIG. 8 is a flowchart of manufacturing the foldable display device by bonding a flexible display panel in the pre-bent state and a functional layer in the pre-bent state provided by the present application.
Figure 10:
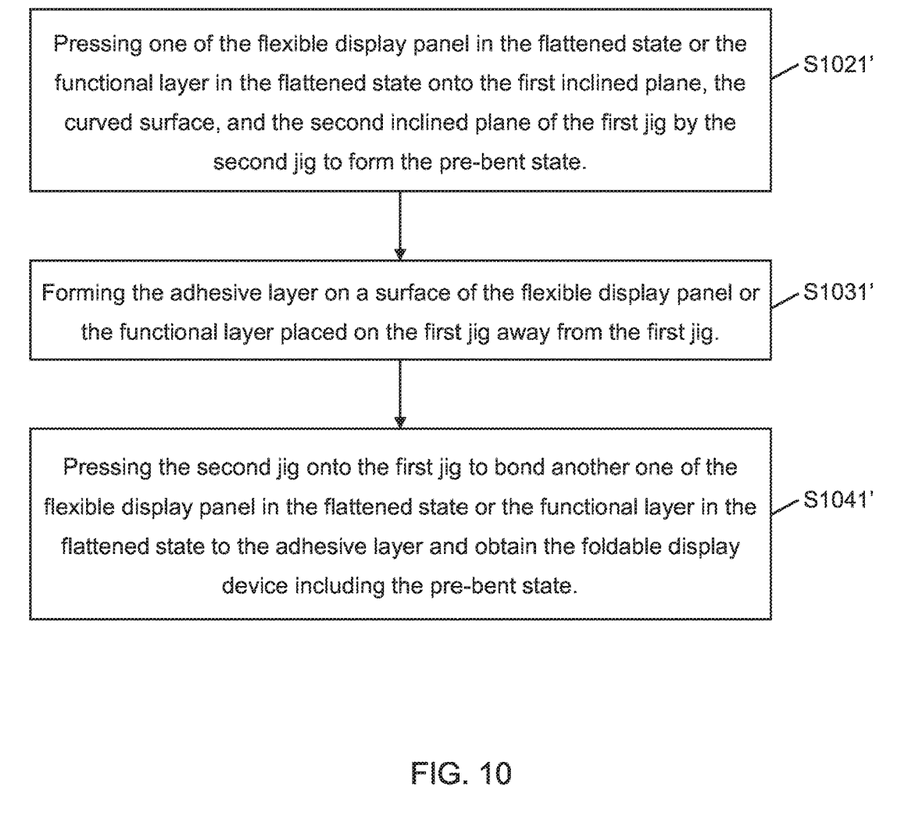
FIG. 10 is a flowchart of manufacturing the foldable display device by bonding the flexible display panel in the flattened state and the functional layer in the flattened state provided by the present application.

Please refer to FIGS. 8 and 10. The jig 20 includes a first jig 201 and a second jig 202. The first jig 201 includes a first inclined plane 2011, a second inclined plane 2012, and a curved surface 2013 connected to the first inclined plane 2011 and the second inclined plane 2012. An angle between the first inclined plane 2011 and the second inclined plane 2012 is greater than 0 degree and less than 180 degrees. The curved surface 2013 of the first jig is curved in an arc shape. The first jig 201 further include a bottom plane 2014. The bottom plane 2014 is connected to the first inclined plane 2011 and the second inclined plane 2012. The first jig 201 is made of a hard material such as a steel sheet or glass. The second jig 202 can be a jig made of a hard material such as a roller, a rotary drum, and a slide having a pressing function, or a jig made of a soft material such as rubber, silicone, or the like having the pressing function.

In an embodiment, a vacuum suction hole (not shown) is disposed on a surface of the first jig 201. One end of the vacuum suction hole is in communication with outside, and an opposite end thereof is in communication with an adsorption device (not shown).

S102: placing one of the flexible display panel 101 or the functional layer 102 on the first inclined plane 2011, the second inclined plane 2012, and the curved surface 2013 of the first jig 201.

S103: forming an adhesive layer 103 on a surface of the flexible display panel 101 or the functional layer 102 placed on the first jig 201 away from the first jig 201.

S104: pressing the second jig 202 onto the first jig 201 to bond another one of the flexible display panel 101 or the functional layer 102 to the adhesive layer 103 and obtain the foldable display device including a pre-bent state.

In the pre-bent state, a stress of a bent portion of the adhesive layer 103 is less than or equal to a first predetermined threshold.

Furthermore, the first predetermined threshold ranges from 0.008 to 0.012 MPa.

The folding region of the foldable display device corresponds to the curved surface 2013 of the first jig 201. The non-folding region corresponds to the first inclined plane 2011 and the second inclined plane 2012 of the first jig 201.

The functional layer 102 includes at least one of a touch layer, a polarizer, a protective cover-plate, a back cover-plate, or a rigid support layer. When the functional layer 102 includes a plurality of layers, two adjacent functional layers 102 are bonded by the adhesive layer.

Figure 9:
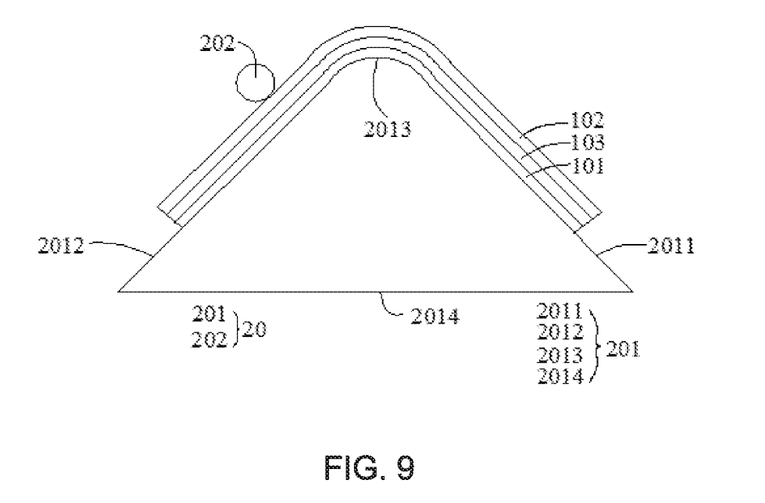
FIG. 9 is a structural diagram of a process of bonding the flexible display panel in the pre-bent state and the functional layer in the pre-bent state by jigs provided by the present application.

Please refer to FIG. 8, which is a flowchart of manufacturing the foldable display device by bonding a flexible display panel in the pre-bent state and the functional layer in the pre-bent state. With reference to FIG. 9, the manufacturing method includes the steps of:

S1021: placing one of the flexible display panel 101 in the pre-bent state or the functional layer 102 in the pre-bent state on the first inclined plane 2011, the second inclined plane 2012, and the curved surface 2013 of the first jig 201.

Specifically, the vacuum suction holes are evenly distributed on the first inclined plane 2011, the curved surface 2013, and the second inclined plane 2012. The flexible display panel 101 or the functional layer 102 on a surface of the first jig 201 is fixed by adsorption of the vacuum suction hole.

S1031: forming the adhesive layer on a surface of the flexible display panel 101 or the functional layer 102 placed on the first jig 201 away from the first jig 201.

Specifically, an optical transparent adhesive is coated on a surface of the flexible display panel 101 in the pre-bent state away from the first jig 201 to form the adhesive layer 103.

S1041: pressing the second jig 202 onto the first jig 201 to bond another one of the flexible display panel 101 in the pre-bent state or the functional layer 102 in the pre-bent state to the adhesive layer 103 and obtain the foldable display device including the pre-bent state.

Specifically, the functional layer 102 in the pre-bent state is bonded to a surface of the adhesive layer 103 away from the flexible display panel 101 in the pre-bent state. The flexible display panel 101 and the functional layer 102 are pressed between the first jig 201 and the second jig 202.

The second jig 202 described here is only described by taking a roller as an example, but is not limited thereto. An axial direction of the roller is parallel to the first jig 201. The second jig 202 moves along the flexible display panel 101 or the functional layer 102 corresponding to one end of the first inclined plane 2011 toward an opposite end corresponding to the second inclined plane 2012 to obtain the foldable display device in the pre-bent state.

Of course, in a condition that the functional layer 102 includes the plurality of layers, two adjacent functional layers 102 can be bonded referring to the above bonding method, and details are not described herein again.

Because the adhesive layer 103 is formed by coating on the flexible display panel 101 in the pre-bent state, the adhesive layer 103 in the pre-bent state is also in a naturally unstressed state (initial state), and a deformation amount thereof is 0. Accordingly, a maximum deformation amount of the adhesive layer 103 when the foldable display device is switched from the pre-bent state to the flattened state or the fully folded state is smaller than that of traditional technology. In addition, because the flexible display panel 101 and the functional layer 102 are bonded in the pre-bent state, when the foldable display device in the pre-bent state, no misalignment occurs between the film layers (i.e., between the flexible display panel 101 and the functional layer 102 and between two adjacent functional layers 102). Therefore, the maximum misalignment amount of the film layers when the foldable display device is switched from the pre-bent state to the flattened state or the fully folded state is smaller than that of traditional technology.

Figure 11:
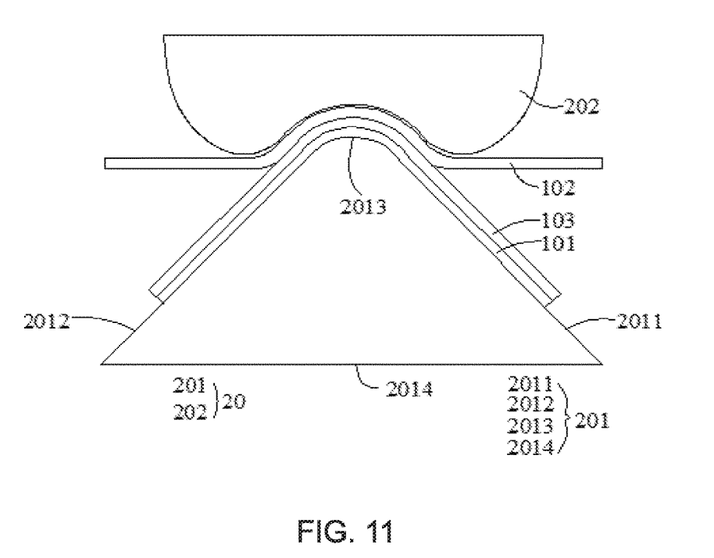
FIG. 11 is a structural diagram of a process of bonding the flexible display panel in the flattened state and the functional layer in the flattened state by jigs provided by the present application.

Please refer to FIG. 10, which is a flowchart of manufacturing the foldable display device by bonding the flexible display panel in the flattened state and the functional layer in the flattened state. With reference to FIG. 11, the manufacturing method includes the steps of:

S1021': pressing one of the flexible display panel 101 in the flattened state or the functional layer 102 in the flattened state onto the first inclined plane 2011, the curved surface 2013, and the second inclined plane 2012 of the first jig 201 by the second jig to form the pre-bent state.

Furthermore, the flexible display panel 101 or the functional layer 102 on a surface of the first jig 201 is adsorbed and maintained the pre-bent state by the vacuum suction hole.

Specifically, the flexible display panel 101 is disposed on the surface of the first jig 201.

S1031': forming the adhesive layer 103 on a surface of the flexible display panel 101 or the functional layer 102 placed on the first jig 201 away from the first jig 201.

Specifically, an optical transparent adhesive is coated on a surface of the flexible display panel 101 away from the first jig 201 to form the adhesive layer 103.

S1041': pressing the second jig 202 onto the first jig 201 to bond another one of the flexible display panel 101 in the flattened state or the functional layer 102 in the flattened state to the adhesive layer 103 and obtain the foldable display device including the pre-bent state.

Specifically, the functional layer 102 in the flattened state is bonded to a surface of the adhesive layer 103 away from the flexible display panel 101. The flexible display panel 101 and the functional layer 102 in the flattened state are pressed between the first jig 201 and the second jig 202.

The second jig 202 described here is only described by taking a soft jig as an example, but is not limited thereto. A depression matching the first jig 201 is formed by pressing and respectively attaching the second jig 201 from a top portion of the curved surface 2013 of the first jig 201 to two opposite sides, which are the first inclined plane 2011 and the second inclined plane 2012.

Specifically, the second jig 202 moves and presses along the flexible display panel 101 or the functional layer 102 corresponding to the top portion of the curved surface 2013 toward directions of the first inclined plane 2011 and the second inclined plane 2012. After pressing is completed, the vacuum suction hole can adjust a suction force to remain the pre-bent state of the flexible display panel 101 and the functional layer 102 after pressing and tightly attach them to the surface of the first jig 201 to facilitate subsequent bonding process. After the bonding process is completed, the foldable display device including the pre-bent state is obtained.

Of course, in a condition that the functional layer 102 includes the plurality of layers, two adjacent functional layers 102 can be bonded referring to the above bonding method, and details are not described herein again.

Because the adhesive layer 103 is formed by coating on the flexible display panel 101 in the pre-bent state, the adhesive layer 103 in the pre-bent state is also in a naturally unstressed state (initial state), and a deformation amount thereof is 0. Accordingly, a maximum deformation amount of the adhesive layer 103 when the foldable display device is switched from the pre-bent state to the flattened state or the fully folded state is smaller than that of traditional technology. In addition, because the flexible display panel 101 in the flattened state and the functional layer 102 in the flattened state are bonded in the pre-bent state, when the foldable display device in the pre-bent state, no misalignment occurs between the film layers (i.e., between the flexible display panel 101 and the functional layer 102 and between two adjacent functional layers 102). Therefore, the maximum misalignment amount of the film layers when the foldable display device is switched from the pre-bent state to the flattened state or the fully folded state is smaller than that of traditional technology.

With reference to FIGS. 9 and 11, in an embodiment, an angle between the first inclined plane 2011 and the second inclined plane 2012 of the first jig 201 is greater than or equal to 10 degrees and less than or equal to 170 degrees.

In an embodiment, the angle between the first inclined plane 2011 and the second inclined plane 2012 of the first jig 201 is equal to 90 degrees.

An arc length of a cross-section of a curved surface 2013 of the first jig 201 is equal to a width of the folding region of the foldable display device. An angle between the first inclined plane 2011 and the second inclined plane 2012 is equal to an angle between two non-folding regions on two opposite sides of the folding region of the foldable display device in the pre-bent state.

The curved surface 2013 of the first jig 201 of the present application can be determined as one or more curved sections with different curvatures on the cross-section of the curved surface according to different pre-bent states of the foldable display device.

Please refer to FIG. 12, which is a structural diagram of a second type of the first jig provided by the present application. The first jig shown in FIG. 12 is basically similar to the first jig shown in FIG. 9 except that the curved surface 2013 is curved in an elliptical arc shape. Using the first jig shown in FIG. 12 and the second jig as described above, a portion of the folding region of the foldable display device including the pre-bent state is curved in an elliptical arc in the pre-bent state.

Please refer to FIG. 13, which is a structural diagram of a third type of the first jig provided by the present application. The first jig shown in FIG. 13 is basically similar to the first jig shown in FIG. 9 except that the curved surface 2013 is curved in an approximately droplet shape. The approximately droplet shape includes two curved segments disposed in a mirror image. Each curved segment includes a first end A and a second end B. A curvature of the curved segment is increased from the first end A to the second end B. The second ends B of the two curved segments coincide. A portion of the folding region of the foldable display device in the pre-bent state made by the first jig shown in FIG. 13 and the second jig described above is bent in the approximately droplet shape in the pre-bent state.

It should be explained that the film layers of the foldable display device in the present application are stacked and bonded sequentially in the above bonding process, which means that when the foldable display device is in the pre-bent state, the deformation amount is 0. Therefore, there is no difference in the deformation amount of the adhesive layer between the film layers due to a difference in bonding radiuses of the different film layers.

In traditional technology, during a process of repeated folding, which folds the foldable display device in the flattened state without stress (tensile stress and compressive stress) to a fully folded state, because of glue layers (adhesive layer) between the film layers being in the long-term deformation state and the difference in radiuses of the film layers in the bending region, the flexible organic light-emitting diode display panel is at the risk of causing breaking. Compared with that, in a process of manufacturing the foldable display device, the present application attaches different film layers of the foldable display device in the pre-bent state through the adhesive layer. Because a deformation amount of the adhesive layer in the pre-bent state is 0, maximum deformation amounts of the adhesive layer between film layers in the flattened state and the fully folded state are reduced, thereby reducing a risk of causing breaking the adhesive layer and a risk of causing peeling or breaking between the film layers.

Although the present application has been disclosed above with the preferred embodiments, it is not intended to limit the present application. Persons having ordinary skill in this technical field can still make various alterations and modifications without departing from the scope and spirit of this application. Therefore, the scope of the present application should be defined and protected by the following claims and their equivalents.

What is claimed is:

1. A foldable display device, comprising:
   a folding region;
   a non-folding region disposed on two opposite sides of the folding region;
   a flexible display panel; and
   at least one functional layer attached to the flexible display panel through an adhesive layer;
   wherein the foldable display device comprises a pre-bent state, a flattened state, and a fully folded state;
   wherein in the pre-bent state, an angle between portions of the foldable display device corresponding to the non-folding region on two opposite sides of the folding region is greater than 0 degree and less than 180 degrees, and a stress of a portion of the adhesive layer corresponding to the folding region is less than or equal to a first predetermined threshold; and
   wherein when the foldable display device is in the pre-bent state, there is no misalignment between the flexible display panel and the at least one functional layer; and
   when the foldable display device is in the flattened state and the fully folded state, the flexible display panel and the at least one functional layer are misaligned.

2. The foldable display device according to claim 1, wherein the first predetermined threshold ranges from 0.008 to 0.012 MPa.

3. The foldable display device according to claim 1, wherein when the foldable display device is in the pre-bent state, a stress variation amount of the adhesive layer is equal to 0 MPa.

4. The foldable display device according to claim 1, wherein when the foldable display device is in the pre-bent state, the angle between the portions of the foldable display device corresponding to the non-folding region on two opposite sides of the folding region is greater than or equal to 10 degrees and less than or equal to 170 degrees.

5. The foldable display device according to claim 1, wherein when the foldable display device is in the flattened state, a stress of a portion of the flexible display panel corresponding to the folding region is less than or equal to a second predetermined threshold, and a stress of a portion of the functional layer corresponding to the folding region is less than or equal to a third predetermined threshold.

6. The foldable display device according to claim 5, wherein the second predetermined threshold ranges from 8 to 12 MPa, and the third predetermined threshold ranges from 0.8 to 11 MPa.

7. The foldable display device according to claim 5, wherein when the foldable display device is in the flattened state, stress variation amounts of the flexible display panel and the adhesive layer are equal to 0 MPa.

8. The foldable display device according to claim 1, wherein when the foldable display device is in the pre-bent state, a stress of a portion of the flexible display panel corresponding to the folding region is less than or equal to a second predetermined threshold, and a stress of a portion of the functional layer corresponding to the folding region is less than or equal to a third predetermined threshold.

9. The foldable display device according to claim 8, wherein the second predetermined threshold ranges from 8 to 12 MPa, and the third predetermined threshold ranges from 0.8 to 11 MPa.

10. The foldable display device according to claim 8, wherein when the foldable display device is in the pre-bent state, stress variation amounts of the flexible display panel and the adhesive layer are equal to 0 MPa.

11. The foldable display device according to claim 1, wherein when the foldable display device is in the pre-bent state, a portion of the foldable display device corresponding to the folding region is curved in an arc shape, an elliptical arc shape, or an approximately droplet shape, the approximately droplet shape comprises two curved segments disposed in a mirror image, each curved segment comprises a first end and a second end, a curvature of the curved segment is increased from the first end to the second end, and the second ends of the two curved segments coincide.

* * * * *